United States Patent Office 3,534,019
Patented Oct. 13, 1970

3,534,019
DIBENZOXAZEPINE - N - CARBOXYLIC ACID HYDRAZIDES AND RELATED COMPOUNDS
William E. Coyne and John W. Cusic, Skokie, Ill., assignors to G. D. Searle & Co., Chicago, Ill., a corporation of Delaware
No Drawing. Continuation-in-part of application Ser. No. 478,994, Aug. 11, 1965. This application Oct. 30, 1967, Ser. No. 679,181
Int. Cl. C07d 53/04, 87/54, 93/42
U.S. Cl. 260—239                                   8 Claims

ABSTRACT OF THE DISCLOSURE

Hydrazides of dibenzoxazepine-, dibenzothiazepine-, and dibenzodiazepine-carboxylic acids are described herein. They are prepared from a hydrazine and an appropriate N-carbonyl chloride and they are active as anti-convulsants, analgesics, and pepsin inhibitors.

SUMMARY OF THE INVENTION

The present application is a continuation-in-part of application Ser. No. 478,994, filed Aug. 11, 1965 and now abandoned.

The present invention relates to a group of compounds which are hydrazides of tricyclic N-carboxylic acids. More specifically, this invention relates to a group of compounds having the following general formula

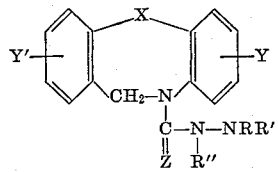

wherein X is selected from the group consisting of O, S, and N—R'''; R''' is selected from the group consisting of hydrogen and lower alkyl; Y and Y' are each selected from the group consisting of hydrogen, halogen, and trifluoromethyl; Z is selected from the group consisting of O and S; R is selected from the group consisting of hydrogen, lower alkyl, and lower alkanoyl; R' is selected from the group consisting of hydrogen and lower alkyl; and R'' is selected from the group consisting of hydrogen and methyl. R and R' can further be combined so that —NRR' can represent cyclic amino groups such as 1-pyrrolidinyl, piperidino, morpholino, and 4-methyl-1-piperazinyl. The halogen atoms referred to above include fluorine, chlorine, bromine, and iodine. The lower alkyl radicals referred to above contain up to 6 carbon atoms and can be illustrated by radicals such as methyl, ethyl, and propyl. The lower alkanoyl radicals referred to above likewise contain up to 6 carbon atoms and can be illustrated by radicals such as acetyl, propionyl, and butyryl.

The compounds of this invention are useful because of their pharmacological properties. In particular, these compounds are useful because of their anti-convulsant activity. Thus, like diphenylhydantoin, they antagonize electroshock seizures. The present compounds also possess analgesic activity. In addition, these compounds show activity as pepsin inhibitors.

The anti-convulsant activity of the present compounds is evident from the results obtained by using a standard procedure which was adapted from that described by E. A. Swinyard et al., J. Pharmacol. and Exp. Therap., 106, 319 (1952). In the procedure, 50 mg./kg. of a compound to be tested is administered intragastrally to each of 10 mice. At a specific time after the administration of the test compound (2.5 hours), each mouse is challenged with a current of 50 milliamperes, delivered via corneal electrodes, for 0.2 second. This current is sufficient to induce maximal electroshock seizures in 100% of control animals. A compound is rated active if the hind limb tonic extensor component of the seizure pattern is abolished in at least 20% of the animals in the group tested. When 10,11-dihydrodibenz[b,f][1,4]oxazepine-10-carboxylic acid hydrazide, 1-acetyl-2-(10,11-dihydrodibenz[b,f][1,4]oxazepine - 10 - carbonyl)hydrazine, and 1-(8-chloro - 10,11 - dihydrodibenz[b,f][1,4]oxazepine-10-carbonyl) - 2,2 - dimethylhydrazine were tested by the above procedure, they were found to be active as anti-convulsants.

The compounds of the present invention are prepared by the reaction of the appropriate hydrazine with an acid halide of the formula

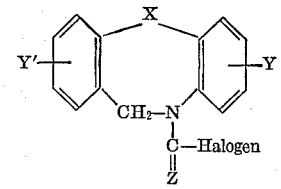

wherein X, Y, Y', and Z are defined as above and halogen is preferably chlorine. Such halides are obtained by the reaction of the appropriate tricyclic amine with phosgene or thiophosgene. The reaction of the acid chloride with the hydrazine is usually carried out at or below room temperature in an inert solvent or a solvent that is less reactive than the hydrazine used.

Those compounds in which R is alkanoyl can be prepared by the reaction of the corresponding hydrogen-substituted compound with the appropriate alkanoyl halide or alkanoic anhydride.

The following examples are presented to further illustrate the present invention; they should not be construed as limiting it in spirit or in scope. In these examples, quantities are indicated in parts by weight unless parts by volume are specified, and temperatures are indicated in degrees centigrade (° C.). The relationship between parts by weight and parts by volume is the same as that existing between grams and milliliters.

EXAMPLE 1

200 parts of 4-chloro-3-nitrobenzotrifluoride is heated to 160° C. and stirred and 160 parts of the potassium salt of salicylaldehyde is added over a period of 30 minutes. After the addition is complete, an exothermic reaction takes place and the temperature rises to about 195° C. Heating is then discontinued until the reaction subsides and the mixture is then heated for 1 hour at 150° C. The mixture is cooled, ice and water are added, and it is then extracted with ether. The ether layer is filtered to remove insoluble material and the resultant solution is dried over sodium sulfate. The ether solvent is then evaporated and the residual oil is recrystallized from a mixture of hexane and benzene to give 2-(2-nitro-4-trifluoromethylphenoxy)benzaldehyde melting at about 79–81° C.

A solution of 55 parts of the ether obtained in the preceding paragraph in 800 parts of ethanol is hydrogenated over Raney nickel catalyst at room temperature and atmospheric pressure. When hydrogen uptake ceases the catalyst is removed by filtration and the ethanol solvent is evaporated. The residue is then dissolved in 500 parts by volume of hexane, filtered, and then cooled. There is then obtained yellowish-white crystals which are separated by filtration to give 8-trifluoromethyl-10,11-dihydrodibenz[b,f][1,4]oxazepine melting at about 86–88° C.

EXAMPLE 2

13 parts of phosgene in 45 parts of toluene is stirred at 5–10° C. and 70 parts of ether is added. This is followed by the addition of a solution of 18.9 parts of 8-trifluoromethyl-10,11-dihydrodibenz[b,f][1,4]oxazepine and 7.2 parts of triethylamine in 140 parts of ether. After the addition is complete, the mixture is stirred for 2 hours and then filtered and the solvent is evaporated from the filtrate. The residue is dissolved in 200 parts by volume of hot hexane and this mixture is then filtered and cooled. This gives 8-trifluoromethyl - 10,11 - dihydrodibenz[b,f][1,4]oxazepine-10-carbonyl chloride melting at about 102–105° C.

EXAMPLE 3

To a stirred solution of 8 parts of phosgene in 30 parts of toluene at 5° C., there is added 50 parts of ether. This is followed by the addition of a solution of 12.4 parts of 10,11-dihydrodibenz[b,f][1,4]oxazepine and 6.4 parts of triethylamine in 90 parts of ether while the temperature is maintained at about 7° C. with cooling. The resultant suspension is stirred for 1 hour after the addition is complete before it is filtered. The residue is washed with ether and the solvent is evaporated from the combined filtrates under reduced pressure. The resultant residue is then recrystallized from petroleum ether to give 10,11-dihydrodibenz[b,f][1,4]oxazepine-10-carbonyl chloride melting at about 109–112° C.

If 8-chloro-10,11-dihydrodibenz[b,f][1,4]oxazepine is reacted with phosgene according to the procedure described in the preceding paragraph, the product obtained is 8 - chloro - 10,11 - dihydrodibenz[b,f]]1,4[oxazepine-10-carbonyl chloride. This compound melts at about 101–104° C. after recrystallization from petroleum ether.

EXAMPLE 4

To a solution of 7.3 parts of 100% hydrazine hydrate in 40 parts of ethanol there is added, at 5–10° C. with stirring, a solution of 13.0 parts of 10,11-dihydrodibenz[b,f][1,4]oxazepine-10-carbonyl chloride in 200 parts by volume of a 1:1 ether-methylene chloride solution. When the addition is complete, the mixture is allowed to warm to room temperature and stirred for 1 hour. The mixture is then filtered and the solvent is evaporated from the filtrate. The resultant residue is dissolved in chloroform and the chloroform solution is washed with water and dried over magnesium sulfate. The chloroform solvent is then evaporated and the resultant crude residue is triturated with petroleum ether to give a white solid which is then recrystallized from ethanol. The product thus obtained is 10,11 - dihydrodibenz[b,f][1,4]oxazepine - 10-carboxylic acid hydrazide melting at about 121–124° C. This compound has the following formula

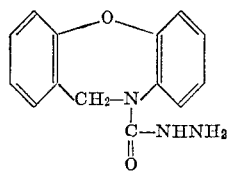

EXAMPLE 5

To a stirred solution of 7.3 parts of 100% hydrazine hydrate in 40 parts of ethanol at 5–10° C. there is added a solution of 13.6 parts of 5-methyl-10,11-dihydro-5H-dibenzo[b,e][1,4]diazepine - 10 - carbonyl chloride in 200 parts by volume of a 1:1 ether-methylene chloride solution. The resultant suspension is stirred for 16 hours at room temperature and the ether and methylene chloride are then evaporated. The resulting suspension is then stirred with 100 parts of water and filtered to give a white crystalline product. This is recrystallized from ethanol to give 5 - methyl - 10,11 - dihydro - 5H - dibenzo[b,e][1,4]diazepine-10-carboxylic acid hydrazide melting at about 171–175° C. This compound has the following formula

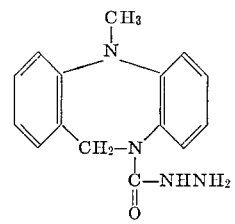

EXAMPLE 6

6.5 parts of 8-chloro-10,11-dihydrodibenz[b,f][1,4]oxazepine-10-carbonyl chloride is reacted with 3.3 parts of 100% hydrazine hydrate according to the procedure described in Example 5. The product obtained in this way is 8 - chloro - 10,11 - dihydrodibenz[b,f][1,4]oxazepine-10-carboxylic acid hydrazide melting at about 179–181° C.

EXAMPLE 7

The procedure of Example 5 is repeated using 6.6 parts of 8-trifluoromethyl-10,11-dihydrodibenz[b,f][1,4]-oxazepine - 10 - carbonyl chloride and 2.5 parts of hydrazine hydrate. In this case, the crude residue obtained after evaporation of the ether and methylene chloride is diluted with water and then extracted with ether. The combined ether extracts are dried over magnesium sulfate and the solvent is then evaporated to leave a colorless oil containing some crystals. The oil is triturated with hexane and the crystalline material which forms is separated by filtration and recrystallized from a mixture of benzene and hexane to give 8-trifluoromethyl-10,11-dihydrodibenz[b,f][1,4]oxazepine - 10 - carboxylic acid hydrazide melting at about 111–113° C.

EXAMPLE 8

The procedure of Example 5 is repeated using 13.8 parts of 10,11 - dihydrodibenzo[b,f][1,4]thiazepine - 10-carbonyl chloride and 7.3 parts of 100% hydrazine hydrate. The product obtained is 10,11-dihydrodibenzo[b,f][1,4]thiazepine-10-carboxylic acid hydrazide melting at about 140–142° C.

EXAMPLE 9

If the procedure of Example 5 is repeated using equivalent quantities of 10,11-dihydro-5H-dibenzo[b,e][1,4]-diazepine-10-carbonyl chloride and 5-ethyl-10,11-dihydro-5H - dibenzo[b,e][1,4]diazepine - 10-carbonyl chloride in place of the 5-methyl-10,11-dihydro-5H-dibenzo[b,e]-[1,4]diazepine-10-carbonyl chloride, the products obtained are, respectively, 10,11-dihydro-5H-dibenzo[b,e]-[1,4]diazepine-10-carboxylic acid hydrazine and 5-ethyl-10,11-dihydro-5H-dibenzo[b,e][1,4]-diazepine-10-carboxylic acid hydrazide.

EXAMPLE 10

Hydrazine is reacted with 10,11-dihydrodibenz[b,f]-[1,4]oxazepine-10-thiocarbonyl chloride according to the procedure described in Example 5 to give 10,11-dihydrodibenz[b,f][1,4]oxazepine-10-thiocarboxylic acid hydrazide.

The thiocarbonyl chloride is obtained in the following manner. 3.5 parts of thiophosgene in 25 parts of toluene is stirred at 5° C. and there is added 70 parts of ether and a solution of 5.0 parts of 10,11-dihydrodibenz[b,f]-[1,4]oxazepine and 3.0 parts of triethylamine in 200 parts of methylene chloride while the temperature is maintained at 5–10° C. The resultant suspension is then stirred for 1 hour before it is filtered and the solvent is evaporated from the filtrate. The resultant residue is extracted with hot benzene and the solvent is evaporated from the benzene solution to leave the residual crude thiocarbonyl chloride used in the above reaction.

EXAMPLE 11

A solution is prepared from 2.5 parts of 10,11-dihydrodibenz[b,f][1,4]oxazepine-10-carboxylic acid hydrazide and 20 parts of pyridine. The solution is stirred and cooled in an ice bath and 5 parts of acetic anhydride is added portionwise. The resultant solution is stirred at 5° C. for 2 hours and then allowed to slowly warm to room temperature. The solvent is then evaporated and the residue is triturated, first with water and then with ether. The white solid thus obtained is recrystallized from ethanol to give 1-acetyl-2-(10,11 - dihydrodibenz[b,f][1,4]oxazepine-10-carbonyl)hydrazine melting at about 164–166° C. This compound has the following formula

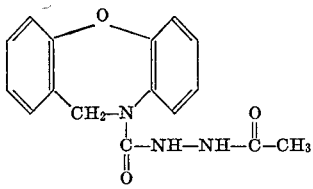

EXAMPLE 12

To a stirred suspension of 5.7 parts of 8-chloro-10,11-dihydrodibenz[b,f][1,4]oxazepine-10-carboxylic acid hydrazine in 220 parts of benzene at room temperature, there is added 2.5 parts of triethylamine and then, portionwise, 1.6 parts of acetyl chloride. The resultant mixture is stirred 1 hour at room temperature and then refluxed for 1 hour. It is then cooled and poured into water. The precipitate which forms is separated by filtration and recrystallized from ethanol to give 1-acetyl-2-(8-chloro-10,11-dihydrodibenz[b,f][1,4]oxazepine - 10 - carbonyl)-hydrazine melting at about 193–195° C.

If an equivalent quantity of propionyl chloride is substituted for the acetyl chloride and the above procedure is repeated, the corresponding propionyl-hydrazine is obtained.

EXAMPLE 13

To a stirred solution of 3.0 parts of 1,1-dimethylhydrazine in 20 parts of ethanol at 5–10° C., there is added a solution of 6.5 parts of 8-chloro-10,11-dihydrodibenz-[b,f][1,4]oxazepine-10-carbonyl chloride in 100 parts by volume of a 1:1 ether-methylene chloride solution. The resultant mixture is stirred for 16 hours at room temperature and the solvent is then evaporated. Water is added to the residue which is then extracted with ether. The ether extracts are dried over potassium carbonate and the solvent is evaporated to leave a residual yellow oil which is 1-(8-chloro-10,11-dihydrodibenz[b,f][1,4]oxazepine-10-carbonyl)-2,2-dimethylhydrazine. An ethanol solution of this compound is mixed with an ethanol solution of oxalic acid. The precipitate which forms is separated and recrystallized from ethanol to give the oxalate salt of the hydrazide, melting at about 162–166° C.

EXAMPLE 14

A suspension is prepared from 10.0 parts of 1,2-dimethylhydrazine dihydrochloride and 40 parts of ethanol. To this suspension is added 10 parts of potassium carbonate and then a solution of 6.5 parts of 8-chloro-10,11-dihydrodibenz[b,f][1,4]oxazepine - 10 - carbonyl chloride in 65 parts of methylene chloride. The resultant mixture is stirred at 5–10° C. for 1.5 hours and then at room temperature for 16 hours. 100 parts of water is then added to the mixture which is stirred for 30 minutes. The organic layer is separated, and the aqueous layer is extracted with methylene chloride. The extract is added to the original organic layer and the combined solutions are dried over magnesium sulfate. The solvent is then evaporated to leave a residual oil which is 1-(8-chloro-10,11-dihydrodibenz[b,f][1,4]oxazepine-10-carbonyl) - 1,2 - dimethylhydrazine. The product is dissolved in ethanol and mixed with an ethanol solution of oxalic acid. The precipitate which forms is separated by filtration and recrystallized to give the oxalic acid salt of the original hydrazine. This product melts at about 140–142° C. The free base of this compound has the following formula

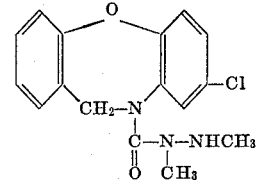

EXAMPLE 15

A solution of 5.2 parts of 10,11-dihydrodibenz[b,f]-[1,4]oxazepine-10-carbonyl chloride, 2.9 parts of 1-amino-4-methylpiperazine, 2.9 parts of 1,4-diazabicyclo[2.2.2]-octane, and 160 parts of 2-butanone is stirred for 16 hours at room temperature. The resulting suspension is filtered and the solvent is evaporated from the filtrate. The residue thus obtained is extracted with ether and the ether extracts are washed with water and then dried over anhydrous potassium carbonate. The ether solvent is evaporated and the residual oil is triturated with petroleum ether to give a white solid. This product is recrystallized from ethanol to give N-(4-methyl-1-piperazinyl)-10,11-dihydrodibenz[b,f][1,4]oxazepine-10-carboxamide melting at about 167–169° C.

EXAMPLE 16

If the procedure of Example 15 is repeated using equivalent quantities of 1,1-diethylhydrazine, 1-aminopiperidine, and 4-aminomorpholine in place of the 1-amino-4-methylpiperazine, the corresponding hydrazide is obtained in each instance.

EXAMPLE 17

The procedure of Example 5 is repeated using 4.5 parts of 10,11-dihydrodibenzo[b,f][1,4]oxazepine-10-carbonyl chloride and 5.4 parts of phenylhydrazine. The product, obtained as yellow crystals melting at about 145–146.5° C., is 1-(10,11-dihydrodibenz [b,f][1,4]oxazepine-10-carbonyl)-2-phenylhydrazine.

What is claimed is:

1. A compound of the formula

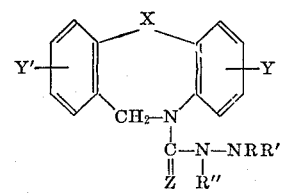

wherein X is selected from the group consisting of O, S, and N—R'''; wherein R''' is selected from the group consisting of hydrogen and lower alkyl; Y and Y' are each selected from the group consisting of hydrogen, chlorine, and trifluoromethyl; Z is selected from the group consisting of O and S; R is selected from the group consisting of hydrogen, lower alkyl, and lower alkanoyl; R' is selected from the group consisting of hydrogen and lower alkyl; and R'' is selected from the group consisting of hydrogen and methyl.

2. A compound according to claim 1 which is 10,11-dihydrodibenz[b,f][1,4]oxazepine-10-carboxylic acid hydrazide.

3. A compound according to claim 1 which is 8-chloro-10,11 - dihydrodibenz[b,f][1,4]oxazepine - 10-carboxylic acid hydrazide.

4. A compound according to claim 1 which is 10,11-dihydrodibenzo[b,f][1,4]thiazepine - 10 - carboxylic acid hydrazide.

5. A compound according to claim 1 which is 5-methyl - 10,11 - dihydro - 5H - dibenzo[b,e][1,4]diazepine-10-carboxylic acid hydrazide.

6. A compound according to claim 1 which is 1-acetyl-2 - (10,11 - dihydrodibenz[b,f][1,4]oxazepine - 10 - carbonyl)hydrazine.

7. A compound according to claim 1 which is 1-acetyl-2 - (8 - chloro - 10,11 - dihydrodibenz[b,f][1,4]oxazepine-10-carbonyl)hydrazine.

8. A compound according to claim 1 which is 1-(8-chloro - 10,11 - dihydrodibenz[b,f][1,4]oxazepine - 10-carbonyl)-2,2-dimethylhydrazine.

References Cited

UNITED STATES PATENTS

| 3,050,524 | 8/1962 | Yale et al. | 260—327 |
| 3,231,565 | 1/1966 | Cusic et al. | 260—239 |

ALTON D. ROLLINS, Primary Examiner

U.S. Cl. X.R.

260—247.1, 247.2, 268, 293.4, 294, 326.3, 326.5, 326.8, 327, 333, 600, 999

PO-1050
(5/69)

UNITED STATES PATENT OFFICE
CERTIFICATE OF CORRECTION

Patent No. 3,534,019     Dated October 13, 1970

Inventor(s) William E. Coyne and John W. Cusic

It is certified that error appears in the above-identified patent and that said Letters Patent are hereby corrected as shown below:

Column 3, line 31, "dihydrodibenz[b,f]]1,4["
should read -- dihydrodibenz[b,f][1,4] --.

Column 4, line 54, "hydrazine" should read -- hydrazide --.

Column 5, lines 25-26, "hydrazine" should read
            -- hydrazide --.

Column 6, line 2, "hydrazine" should read -- hydrazide --.

SIGNED AND
SEALED
FEB 2 1971

(SEAL)
Attest:
Edward M. Fletcher, Jr.
Attesting Officer

WILLIAM E. SCHUYLER, JR.
Commissioner of Patents